(12) United States Patent
Peters et al.

(10) Patent No.: US 6,260,801 B1
(45) Date of Patent: Jul. 17, 2001

(54) SWING PIVOT THRUST REVERSER

(75) Inventors: Frederick H. Peters, Tulsa; Thomas J. Jannetta, Bixby, both of OK (US)

(73) Assignee: The Nordam Group, Inc., Tulsa, OK (US)

( * ) Notice: Subject to any disclaimer, the term of this patent is extended or adjusted under 35 U.S.C. 154(b) by 0 days.

(21) Appl. No.: 09/398,340

(22) Filed: Sep. 17, 1999

(51) Int. Cl.[7] .................................................. F02K 1/10
(52) U.S. Cl. ........................ 244/110 B; 239/265.29; 239/265.37; 60/226.2; 60/230
(58) Field of Search .................. 244/110 B; 239/265.19, 239/265.37, 265.39, 265.29; 60/226.2, 230

(56) References Cited

U.S. PATENT DOCUMENTS

| | | | |
|---|---|---|---|
| 3,020,712 | * 2/1962 | Dolliver | 244/110 B |
| 3,532,275 | * 10/1970 | Hom et al. | 239/265.37 |
| 3,893,626 | * 7/1975 | Leibach et al. | 239/265.19 |
| 4,030,687 | * 6/1977 | Hapke | 244/110 B |
| 4,147,027 | 4/1979 | Greathouse . | |
| 4,182,501 | 1/1980 | Fage . | |
| 4,194,692 | * 3/1980 | Dickenson | 239/265.39 |
| 4,422,605 | 12/1983 | Fage . | |
| 4,424,669 | 1/1984 | Fage . | |
| 5,310,117 | 5/1994 | Fage et al. . | |
| 5,775,639 | 7/1998 | Fage . | |

* cited by examiner

Primary Examiner—Galen L. Barefoot
(74) Attorney, Agent, or Firm—Francis L. Conte

(57) ABSTRACT

A hinge arm for a thrust reverser door may be mounted to an exhaust nozzle using an aft mount. The mount includes a frame for attachment to the nozzle. A swing link has a first pin pivotally joined to the frame, and a second pin for pivotally joining the hinge arm to the link to permit both swinging and pivoting of the hinge arm from the frame. The aft mount thusly permits the reverser doors to be reliably stowed around the nozzle.

37 Claims, 14 Drawing Sheets

SWING PIVOT THRUST REVERSER

BACKGROUND OF THE INVENTION

The present invention relates generally to aircraft gas turbine engines, and, more specifically, to thrust reversers therefor.

In a turbofan engine, combustion gases are discharged through an exhaust nozzle for providing thrust to propel an aircraft in flight. Upon landing, a thrust reverser is deployed for reversing the direction of exhaust flow for providing a braking thrust force for reducing aircraft ground speed.

A common thrust reverser includes a pair of thrust reverser doors which surround the exhaust nozzle on diametrically opposite sides thereof when stowed or retracted. In this position, the trailing edges or lips of the doors surround the nozzle outlet and provide unobstructed flow therefrom.

The doors are deployed by rotation or pivoting thereof, with the aft lips moving radially inwardly to block the nozzle outlet, and leading edges or lips moved radially outwardly to uncover side outlets of the nozzle. The deployed doors have a clamshell configuration which redirects the exhaust flow radially outwardly through the sides of the nozzle and in an axially forward direction for providing reverse thrust.

In a typical configuration, the individual doors are mounted to the exhaust nozzle at single pivots. The doors may thusly be simply opened and closed by single axis pivoting using a suitable actuator.

However, the doors must be securely locked when stowed to prevent inadvertent deployment during flight. Door locking must be effected with a high level of reliability, which correspondingly substantially increases the complexity, weight, and expense of the thrust reverser. Increased complexity of the thrust reverser increases cost of initial procurement as well as maintenance thereof over its useful life. Increased complexity adds weight to the thrust reverser and correspondingly reduces overall performance of the aircraft.

The Federal Aviation Administration (FAA) has requirements for further increasing thrust reverser reliability. Increased reliability requirements cause a further increase in complexity of conventional single pivot thrust reversers, and further increase cost, weight, and maintenance requirements therefor.

Accordingly, it is desired to provide an improved thrust reverser having increased reliability without corresponding increase in complexity thereof.

BRIEF SUMMARY OF THE INVENTION

A hinge arm for a thrust reverser door may be mounted to an exhaust nozzle using an aft mount. The mount includes a frame for attachment to the nozzle. A swing link has a first pin pivotally joined to the frame, and a second pin for pivotally joining the hinge arm to the link to permit both swinging and pivoting of the hinge arm from the frame. The aft mount thusly permits the reverser doors to be reliably stowed around the nozzle.

BRIEF DESCRIPTION OF THE DRAWINGS

The invention, in accordance with preferred and exemplary embodiments, together with further objects an d advantages thereof, is more particularly described in the following detailed description taken in conjunction with the accompanying drawings in which.

DETAILED DESCRIPTION OF THE INVENTION

Figure 1:
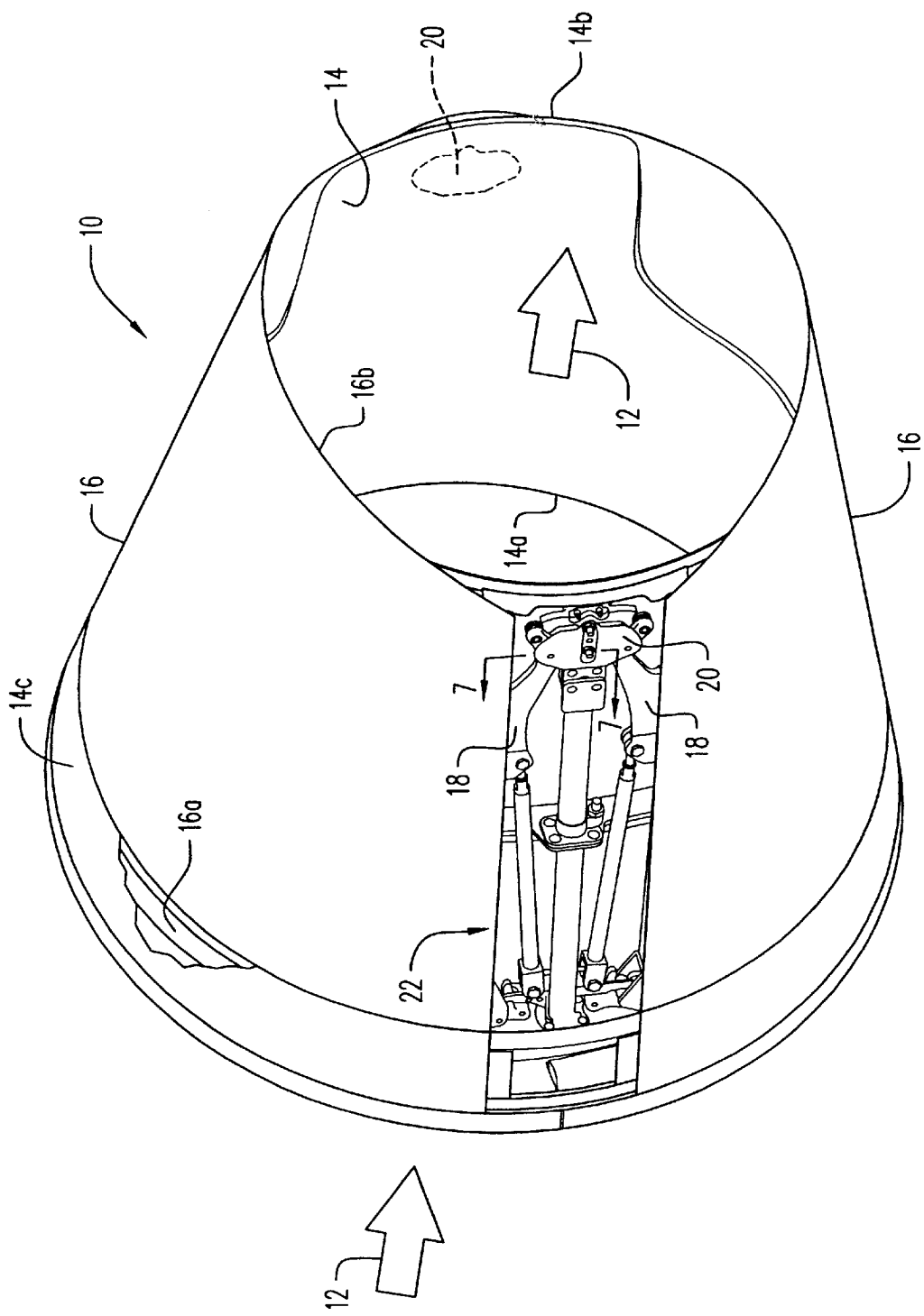
FIG. 1 is an isometric view of a thrust reverser for an aircraft gas turbine engine configured in accordance with an exemplary embodiment of the present invention.

Illustrated in FIG. 1 is an exemplary clamshell-type thrust reverser 10 in accordance with an exemplary embodiment of the present invention. The thrust reverser is generally axisymmetrical about a longitudal or axial centerline axis and is configured for being fixedly attached to an aft end of a turbofan aircraft gas turbine engine (not shown). Exhaust flow 12 in the form of spent combustion gases and bypass fan air is discharged from the engine and through the thrust reverser for producing thrust to propel the aircraft in flight.

The thrust reverser includes an annular exhaust nozzle 14 having an inlet 14a at an upstream or forward end for receiving the exhaust flow 12, and an aft outlet 14b at an opposite downstream or aft end for discharging the exhaust flow in an axial downstream direction for producing forward propulsion thrust. The nozzle 14 may have any conventional configuration and is suitably fixedly attached to the aft end of the engine for providing a stationary member therewith. The nozzle also includes an annular sleeve defining an external cowling 14c at its upstream end which is typically coextensive with the cowling or nacelle surrounding the core engine.

The thrust reverser also includes a pair of thrust reverser doors 16 disposed on diametrically opposite sides of the nozzle substantially coextensively with the cowling 14c when stowed. Each door 16 may have a conventional configuration, and is typically an arcuate, generally semicircular component surrounding corresponding half portions of the nozzle. Each door 16 includes an axially forward or upstream edge or lip 16a, and an axially opposite, downstream or aft edge or lip 16b.

Each door is typically a lightweight construction with a sheet metal external surface, and a sheet metal internal surface mounted to corresponding stiffening frames or ribs radially therebetween. Each door is supported along its circumferentially opposite edges by corresponding pivot or hinge arms 18. The hinge arms permit each door to be deployed and retracted in an improved apparatus and method in accordance with the present invention.

More specifically, the thrust reverser illustrated in FIG. 1 further includes a pair of aft mounts 20 fixedly joined to the nozzle adjacent to respective hinge arms 18 for pivotally mounting the doors to the nozzle. Since each door includes two hinge arms 18, two respective aft mounts 20 are provided on opposite sides of the nozzle for mounting thereof. The aft mounts 20 illustrated in FIG. 1 are each configured as double mounts with symmetrically identical features for supporting the respective hinge arms 18a of the opposite doors.

Figure 2:
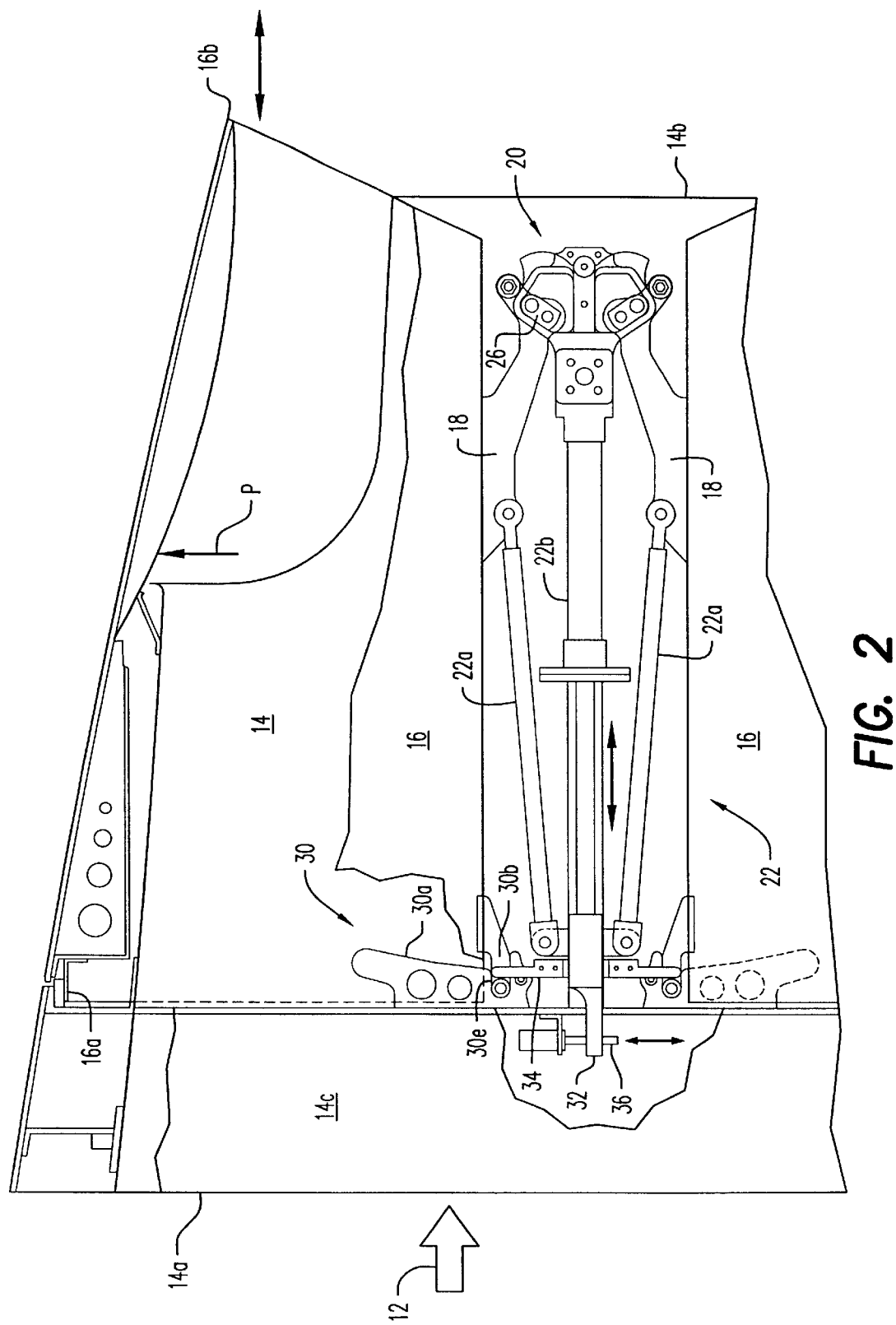
FIG. 2 is a side elevational view of a portion of the thrust reverser illustrated in FIG. 1 showing reverser doors in their stowed position.

In accordance with the present invention, means 22 are providing for deploying and retracting the doors 16 by swinging and pivoting in turn the hinge arms 18 in their aft mounts 20. In FIGS. 1 and 2, the doors are shown in their fully retracted or stowed position in which the door forward lips 16a are nested or coupled, and locked, inside the trailing edge or aft lip of the cowling 14c which defines a seat therefor.

Figure 3:
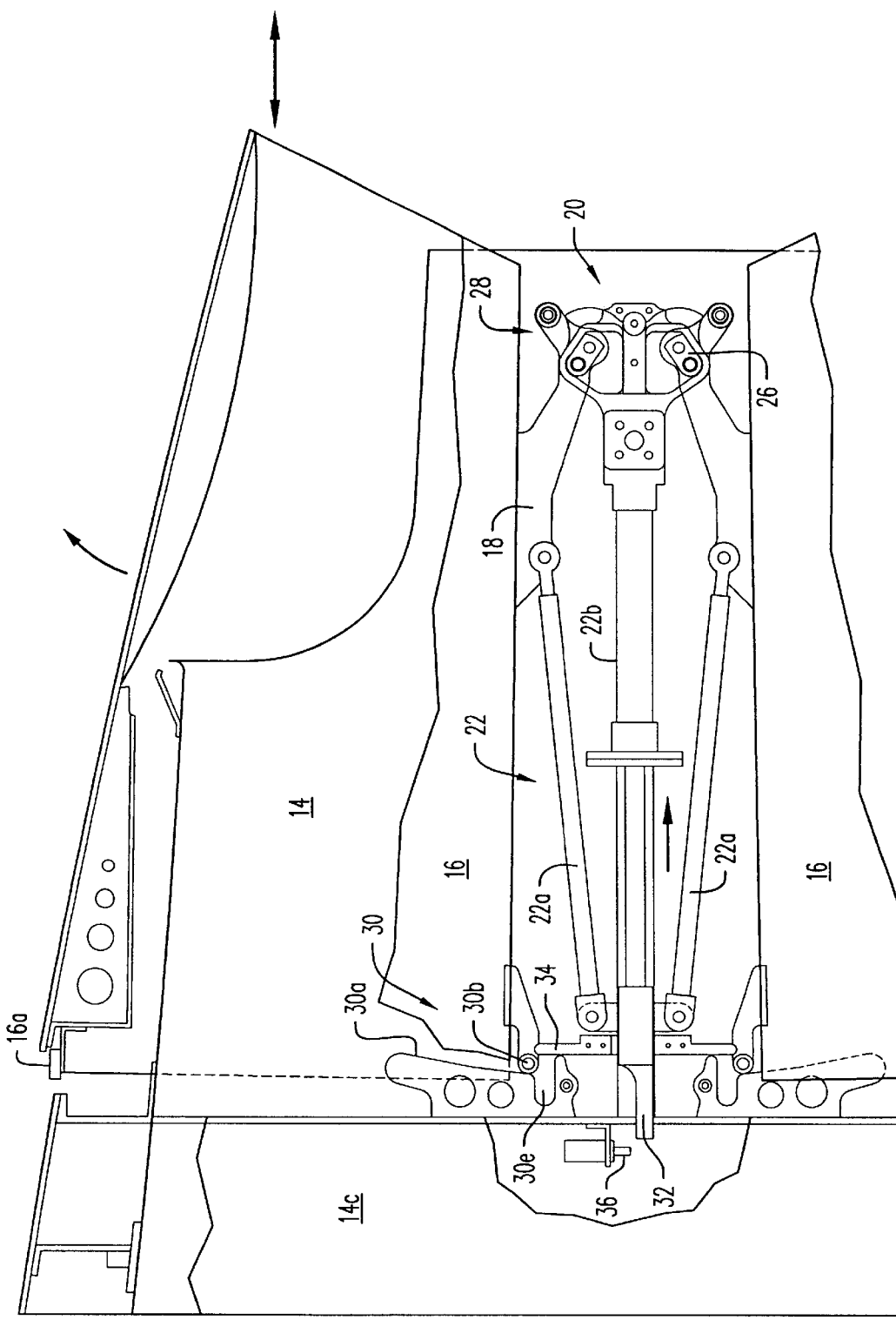
FIG. 3 is a side elevational view of a portion of the thrust reverser illustrated in FIG. 1 showing reverser doors in their decoupled or release position.

In FIG. 3, the deploying means initially swing aft the swing arms 18 to un-nest or decouple the door forward lip 16a from the cowling 14c for unlocking the doors from the cowling.

Figure 4:
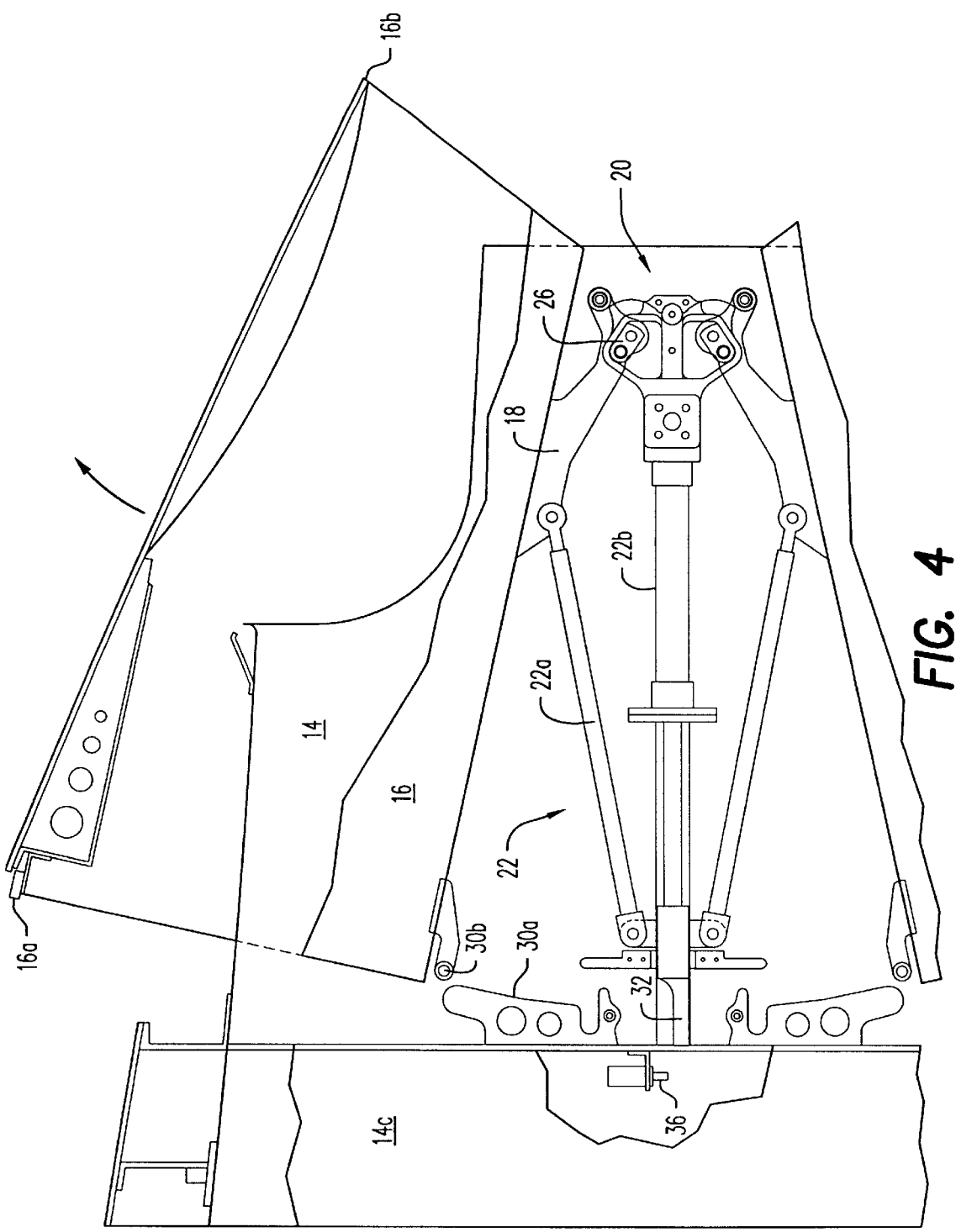
FIG. 4 is a side elevational view of a portion of the thrust reverser illustrated in FIG. 1 showing reverser doors in their intermediate deployed position.
Figure 5:
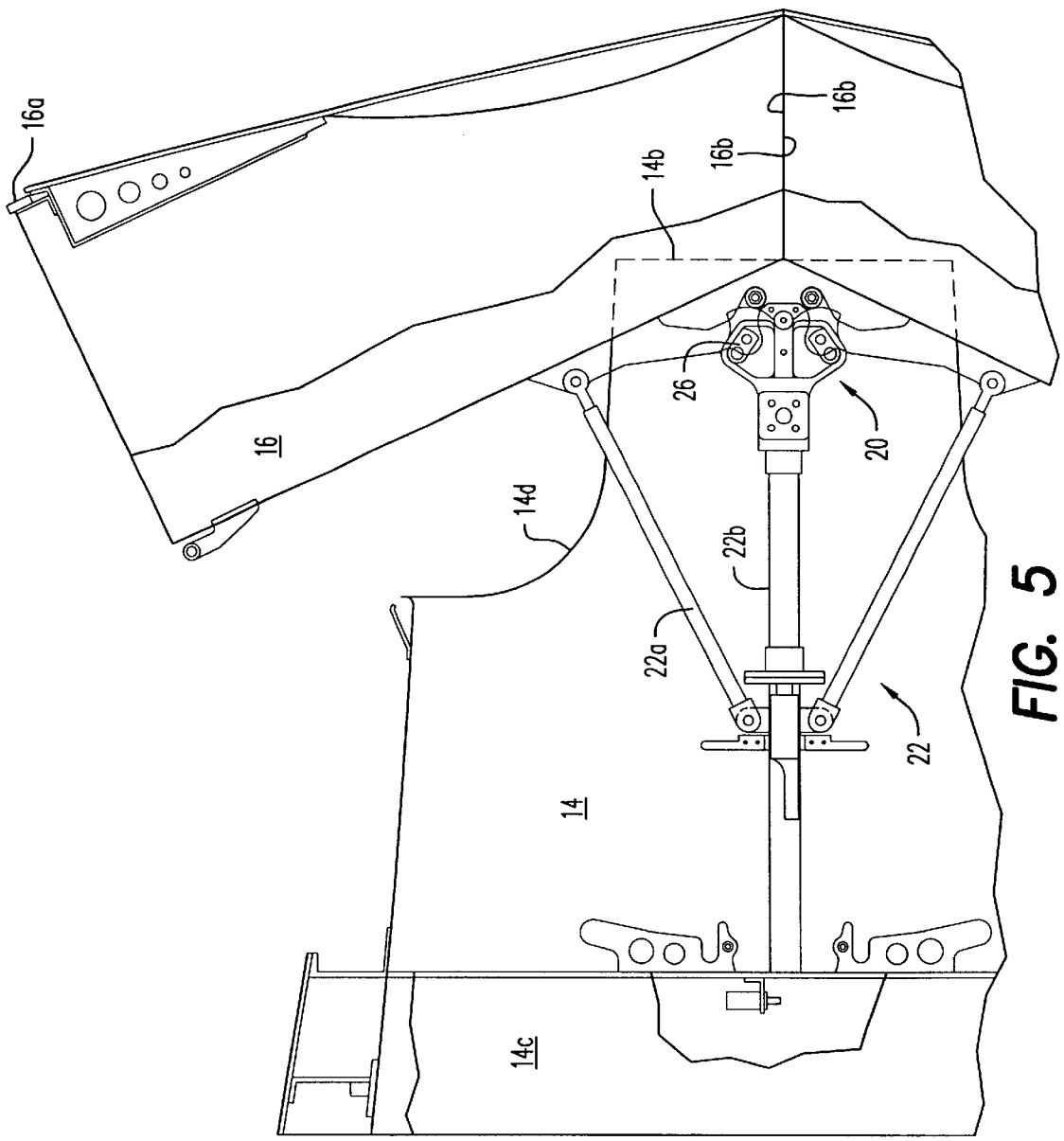
FIG. 5 is a side elevational view of a portion of the thrust reverser illustrated in FIG. 1 showing reverser doors in their deployed position.

As shown in FIGS. 4 and 5 in sequence, the deploying means are then operated to pivot the doors about their hinge arms in the respective aft mounts to the fully extended or deployed position of the doors in which the door aft lips 16b adjoin or abut each other, and the door forward lips 16a extending radially outwardly. The doors in FIG. 5 are in the typical clamshell position with the doors blocking the nozzle aft outlet 14b and uncovering corresponding side outlets 14d for diverting the exhaust flow in an axially forward direction for producing reverse thrust.

Figure 6:
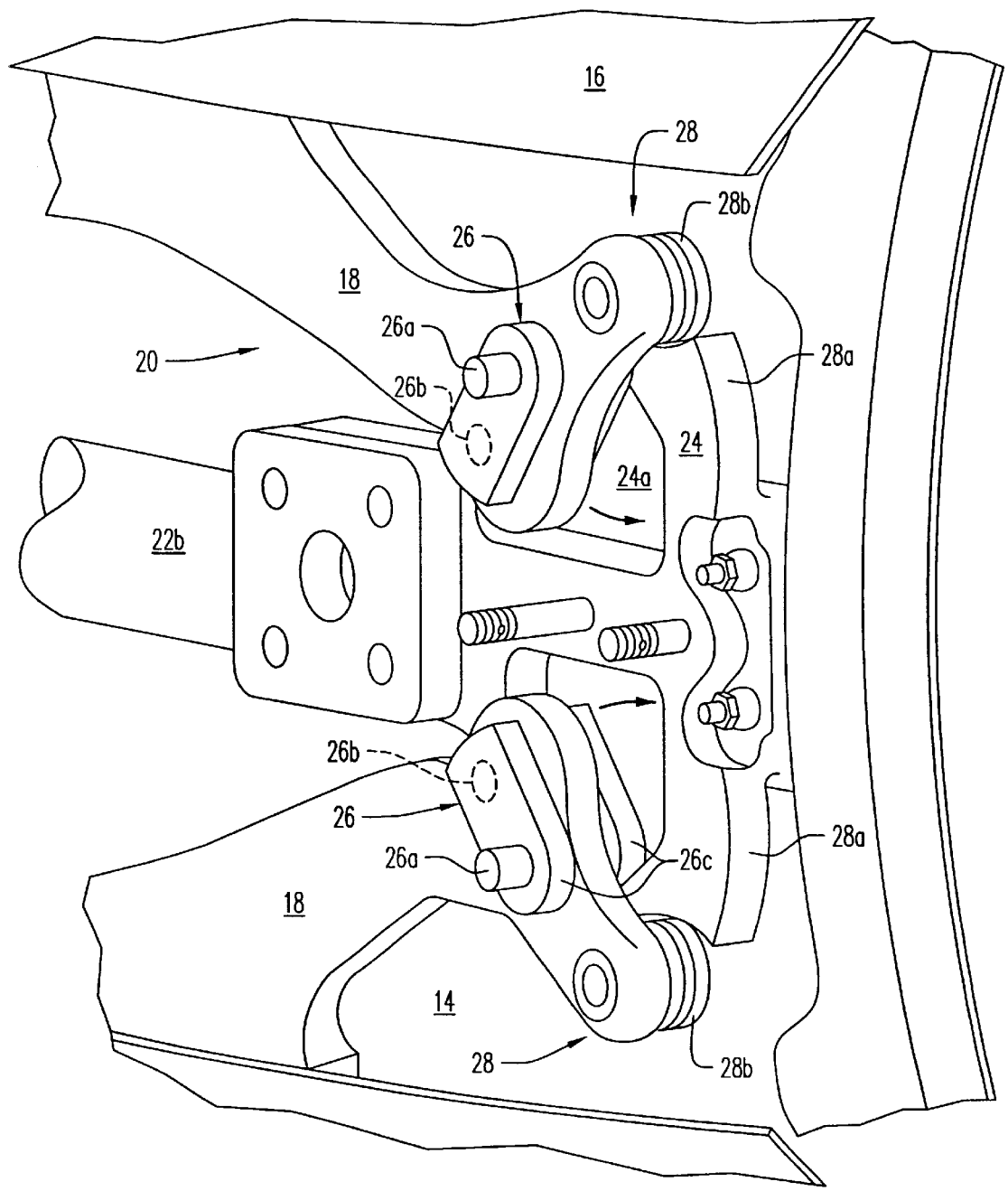
FIG. 6 is an isometric enlarged view of a portion of the aft mount illustrated in FIG. 2 in accordance with one embodiment of the present invention.
Figure 7:
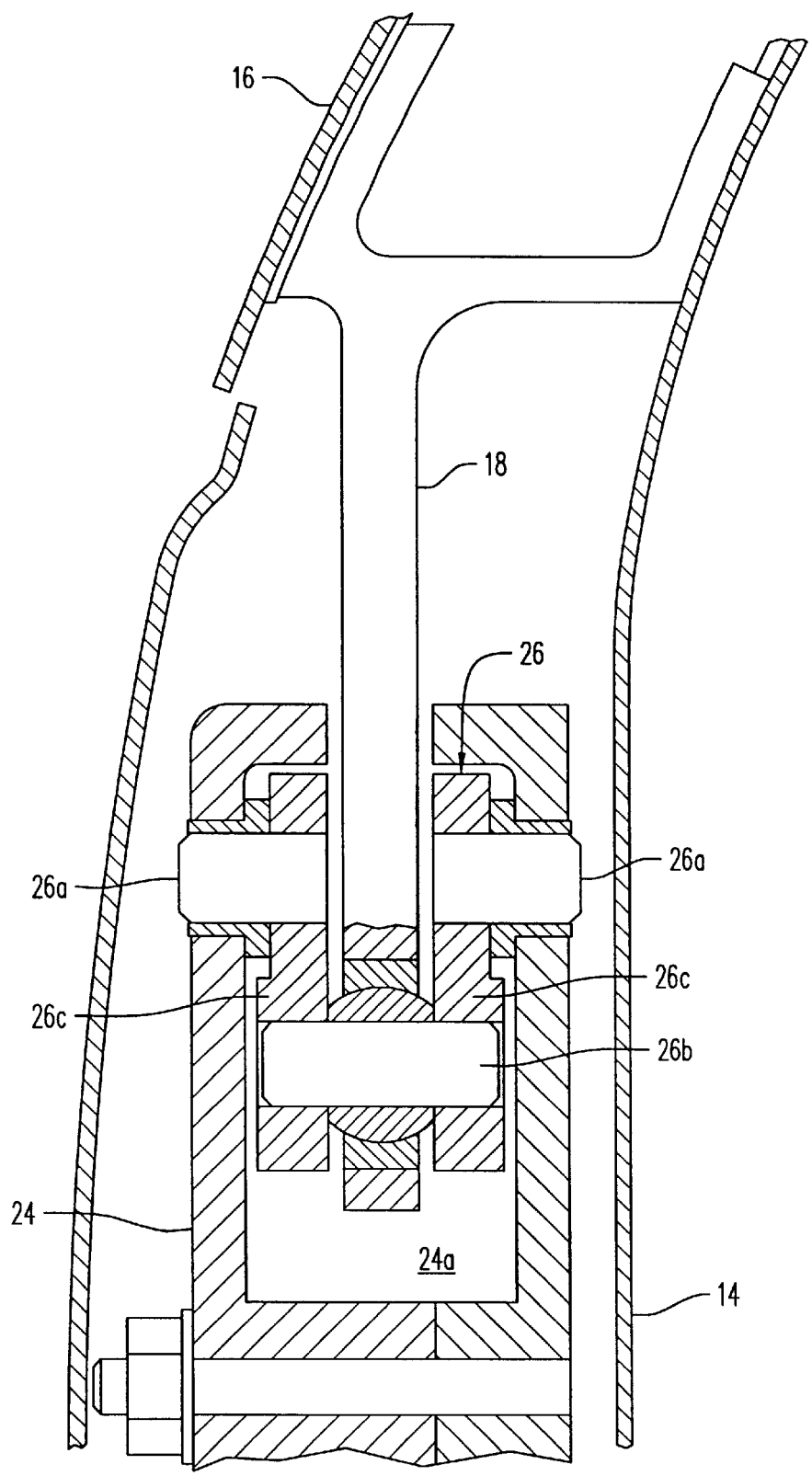
FIG. 7 is an elevational, partly sectional transverse view of a portion of the aft mount illustrated in FIG. 1 and taken along line 7—7.

The aft mount 20 is illustrated in more particularity in accordance with a preferred embodiment of the present invention in FIGS. 6 and 7. Each mount includes a fixed frame 24 suitably configured for being fixedly attached to the outside of the nozzle 14, by threaded fasteners for example. A swing link 26 is configured to mount a corresponding hinge arm 18 to the frame 24 for obtaining both swinging and pivoting therebetween, and provides a compound rotating pivot.

Each swing link 26 includes a first pin 26a at a proximal end thereof pivotally joined to the frame, using suitable bushings for example. Each link also includes a second pin 26b at an opposite distal end for pivotally joining the hinge arm 18 to the link. In this way, the hinge arm 18 is pivoted to the swing link 26 which in turn is pivoted to the frame 24. The swing link 26 is pivoted to the frame inside a corresponding pocket 24a which limits the axial forward and aft swinging of the link in cooperation with the deployment means.

In a preferred embodiment illustrated in FIGS. 6 and 7, each swing link 26 further includes a pair of laterally spaced apart swing arms 26c each having a respective one of the first pins 26a extending oppositely away from each other for engaging corresponding bushings in opposite sides of the fixed frame 24. The two swing arms 26c are joined together by a common second pin 26b which extends through a suitable bearing, such as a uniball, mounted in the distal end of the hinge arm 18. In this way, the hinge arm is pivotally mounted to the swing link, and the swing link is pivotally mounted in turn to the frame. The swing link pivots or swings about the first pins 26a within the defined limits of the corresponding frame pocket 24a. And, the hinge arm 18 is also allowed to pivot about the second pin 26b.

Returning to FIG. 2, the deploying means 22 preferably include respective drive rods or links 22a pivotally joined at distal ends to the respective doors 16 forward of the hinge arms 18. Four drive links 22a cooperate with their respective four hinge arms 18.

A pair of linear actuators 22b are mounted on opposite sides of the nozzle and extend axially symmetrically with the respective aft mounts. The actuators may take any conventional form, such as a hydraulic actuator with an output shaft or a rod that may be extended or retracted as desired. The actuator shaft is pivotally joined to a corresponding pair of the drive links 22a in a conventional and symmetrical manner. In FIG. 2, the actuator shaft is extended in the forward direction for placing the drive links 22a in tension for positioning the doors in their stowed positions. By withdrawing the actuator shaft in the axially aft direction, the drive links 22a are placed in compression for swinging and pivoting the hinge arms in the aft mounts for deploying the two doors 16.

Figure 8:
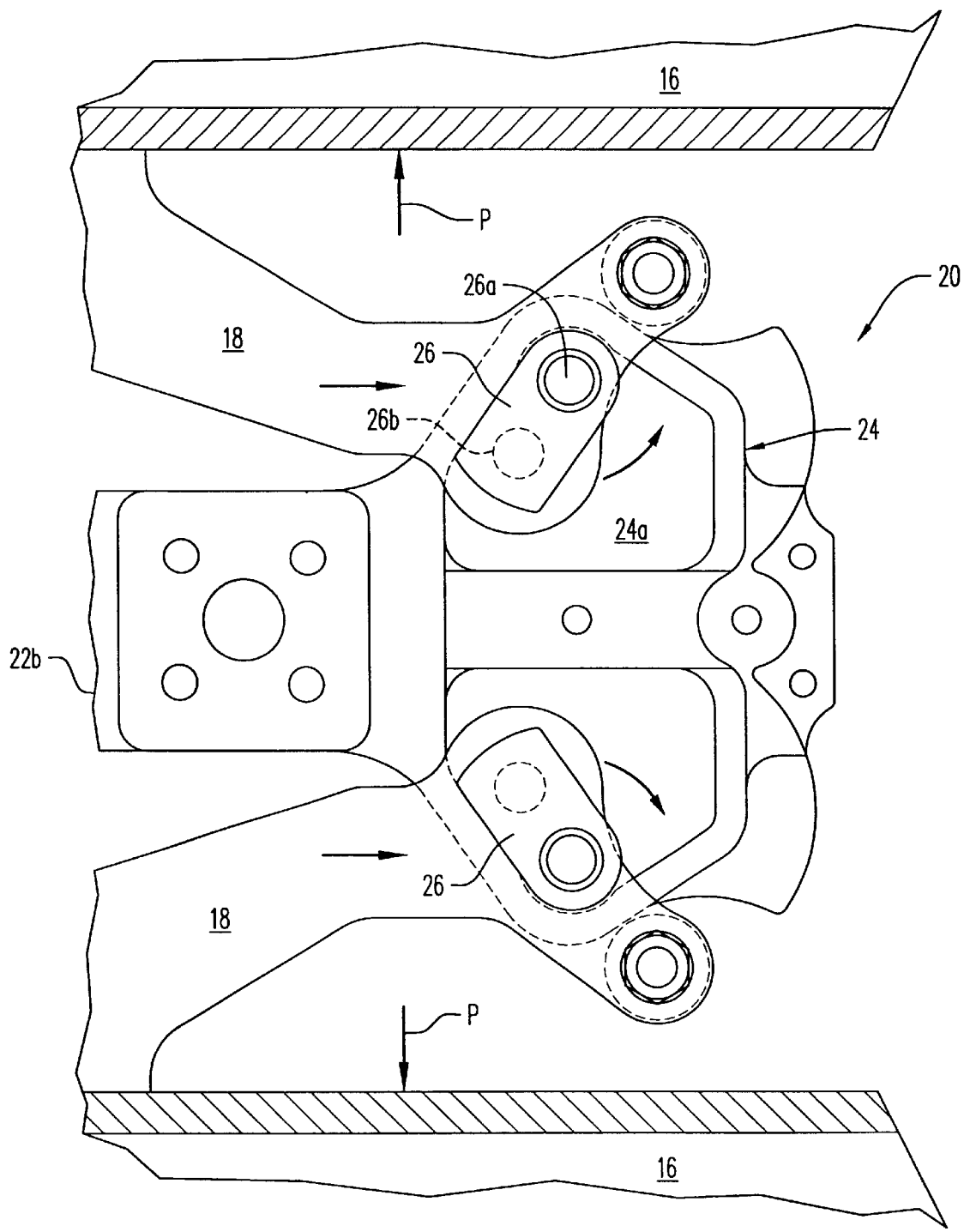
FIG. 8 is an enlarged side elevational view of the aft mount illustrated in FIGS. 2 and 6.

In the preferred embodiment illustrated in FIG. 2, the drive links 22a extend axially and generally parallel with the actuator in the stowed position of the doors, with the swing links 26 being disposed in a forward swing position, as shown in more detail in FIG. 8. In the forward swing position, the door forward lips 16a as illustrated in FIG. 2 are coupled or nested inside the aft lip of the cowling 14c which provides an effective locking mechanism or means for maintaining the doors in their stowed positions.

As initially shown in FIG. 2, the exhaust flow 12 through the nozzle 14 creates a radially outwardly directed pressure force P against the doors 16. Radial movement of the forward lip 16a is prevented by nesting the forward lip with the cowling through which reaction forces are carried.

Furthermore, the pressure force acting on the doors as illustrated in FIG. 8 are also reacted through the respective arms 18 which correspondingly self-lock the swing links 26 in their forward swing positions inside the frame pockets 24a. As shown in FIG. 8, the upper swing link 26 tends to rotate clockwise due to the exhaust pressure reacted therethrough, which rotation is limited or prevented by the surrounding frame 24. The forward swing of the swing link 26 ensures that the door forward lips 16a remain coupled to the cowling.

Figure 9:
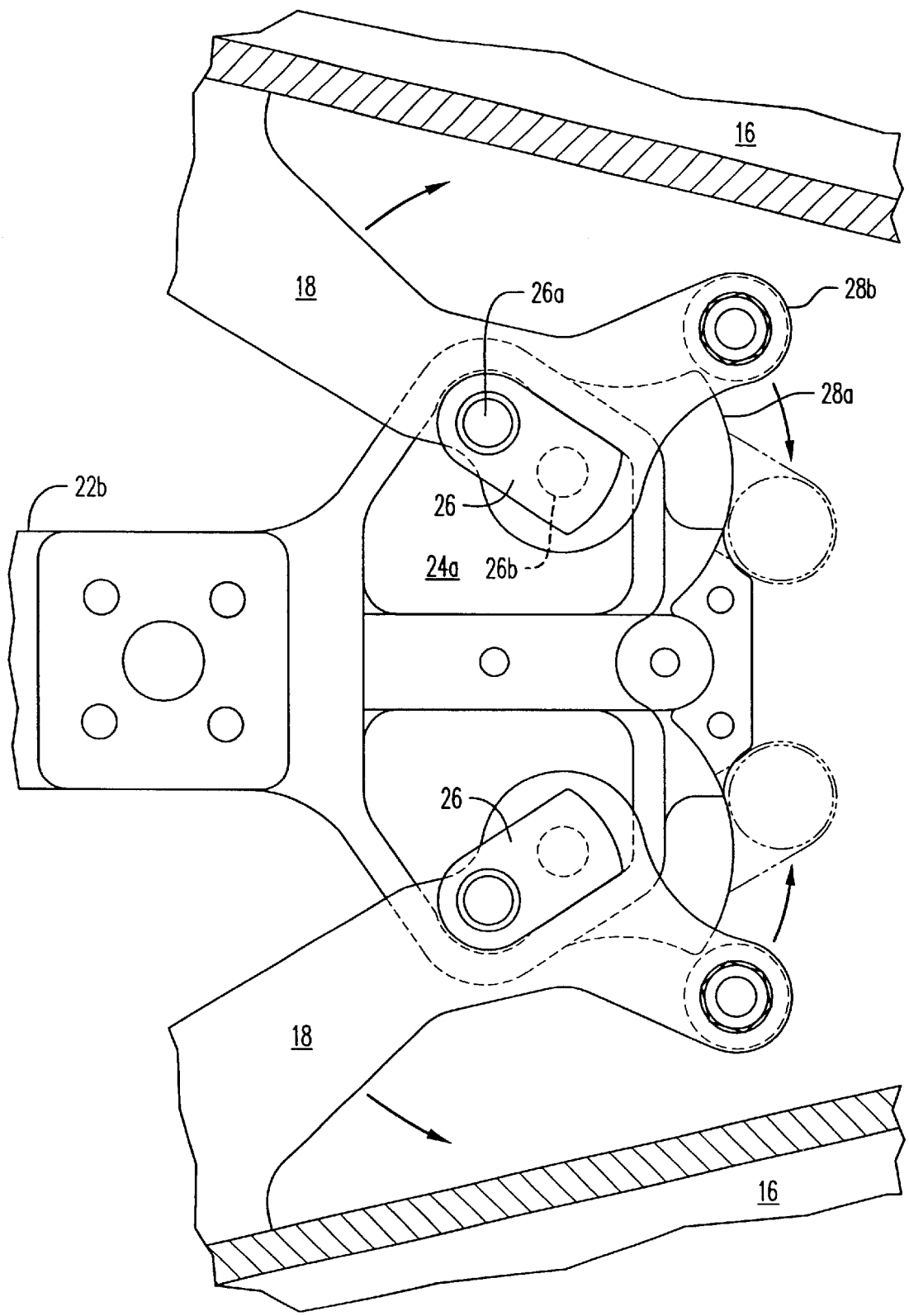
FIG. 9 is an enlarged side elevational enlarged view of the aft mount illustrated in FIG. 4.

In order to deploy the reverser door 16, the actuator 22b illustrated in FIG. 3 is powered to retract or withdraw its output shaft to provide an aft axial force through the drive links and in turn through the hinge arms to swing the swing links to their aft position illustrated in more detail in FIG. 9. In this position, the swing links cause the door forward lips 16a to translate axially aft to uncouple those lips from the cowling 14c as illustrated in FIG. 3. The so uncoupled doors are then permitted to pivot on the second pins 26b of the swing links and deploy. As shown in FIG. 4, the actuator 22b is powered to further withdraw its actuator shaft and push the drive links 22a in the aft direction which causes the corresponding doors to pivot about their hinge arms 18a in the aft mounts 20.

In FIG. 5, the two doors 16 have been pivoted to their deployed position for thrust reversal operation. The drive links 22a are inclined in the aft and radially outward direction, and provide reaction load paths for pressure forces acting on the reverser doors. The swing links 26 are disposed in their aft swing positions and locked thereat as described hereinbelow.

Accordingly, the swing-pivot aft mounts 20 illustrated in FIG. 2 are extremely simple in configuration and operation for providing an advanced single pivot thrust reverser for substantially increased reliability without attendant increase in complexity, weight, and cost. The swing links 26 are fully contained within the housing or frame of the aft mount. They permit the stowed doors 16 to initially swing or pivot in the axially aft direction away from the cowling 14c to unlock and uncouple the doors therefrom. The deploying means 22 may then be operated in a substantially conventional manner for pivoting the doors 16 radially outwardly from the nozzle 14 to their deployed position for reversing flow of the exhaust gases therefrom.

As shown in FIG. 8, the doors 16 are initially swung in a first rotary direction on the swing links 26, in the exemplary counterclockwise direction illustrated for the upper swing link. This permits the forward lip of the corresponding door to translate axially aft to decouple the door from nesting inside the cowling 14c.

In the aft position of the swing links 26 illustrated in FIG. 9, the doors 16 may be then pivoted in an opposite, second rotary direction for deployment. The second rotary direction for the upper link is clockwise for the corresponding upper hinge arm 18.

The two reverser doors may then be retracted by simply reversing the pivoting thereof and their corresponding hinge arms, and then reversing, in turn, the swinging thereof atop the corresponding swing links to again nest the door forward lips 16a inside their corresponding seats of the cowling 14c. As indicated above, the forward position of the swing links 26 illustrated in FIG. 8 provides an initial mechanism for locking the doors in their nested and stowed positions under pressure from the exhaust flow.

As initially illustrated in FIG. 6, the swing links 26 are pivoted at their first pins 26a in the manner of a pendulum for swinging axially forwardly and aftly in generally equal but opposite amounts. The respective hinge arms 18 are correspondingly pivotally joined to the respective swing links at the second pins 26b. This two pin mounting arrangement for the individual hinge arms permits compound rotary motion, which is preferably effected independently of each other.

More specifically, the doors 16 are preferably operated to prevent swinging of the doors and hinge arms during pivoting thereof to uncouple pivoting from swinging. In this way, controlled aft translation of the door forward lips to unlock the doors may be obtained prior to pivoting the doors for deployment.

In the exemplary embodiment illustrated in FIG. 6, means 28 are provided for latching each of the swing links 26 in their aft swing positions during rotary deployment of the doors. The latching means 28 include an aft track or cam surface 28a fixedly joined to the frame 24 in each mount by being integrally formed therewith as shown. A follower 28b in the exemplary form of a wheel or roller is pivotally joined to a corresponding extension of the hinge arm 18 adjacent to the respective aft tracks 28a.

In FIG. 6, the wheels 28b are prevented from following the tracks 28a by the forward positions of the swing links. In FIG. 9, however, the swing links 26 are in their aft swing position which aligns the respective wheels 28b and tracks 28a for permitting the wheels to follow the tracks as the hinge arms pivot about the second pins 26b to the deployed position of the doors. Since the wheel extends aft from the first pin 26a, and the second pin 26b is disposed axially therebetween, the swing link 26 is trapped in its aft position as the wheel follows the track. In this way, the swing link is prevented from inadvertently moving to its forward position, and misalignment of the doors during deployment is avoided.

Figure 10:
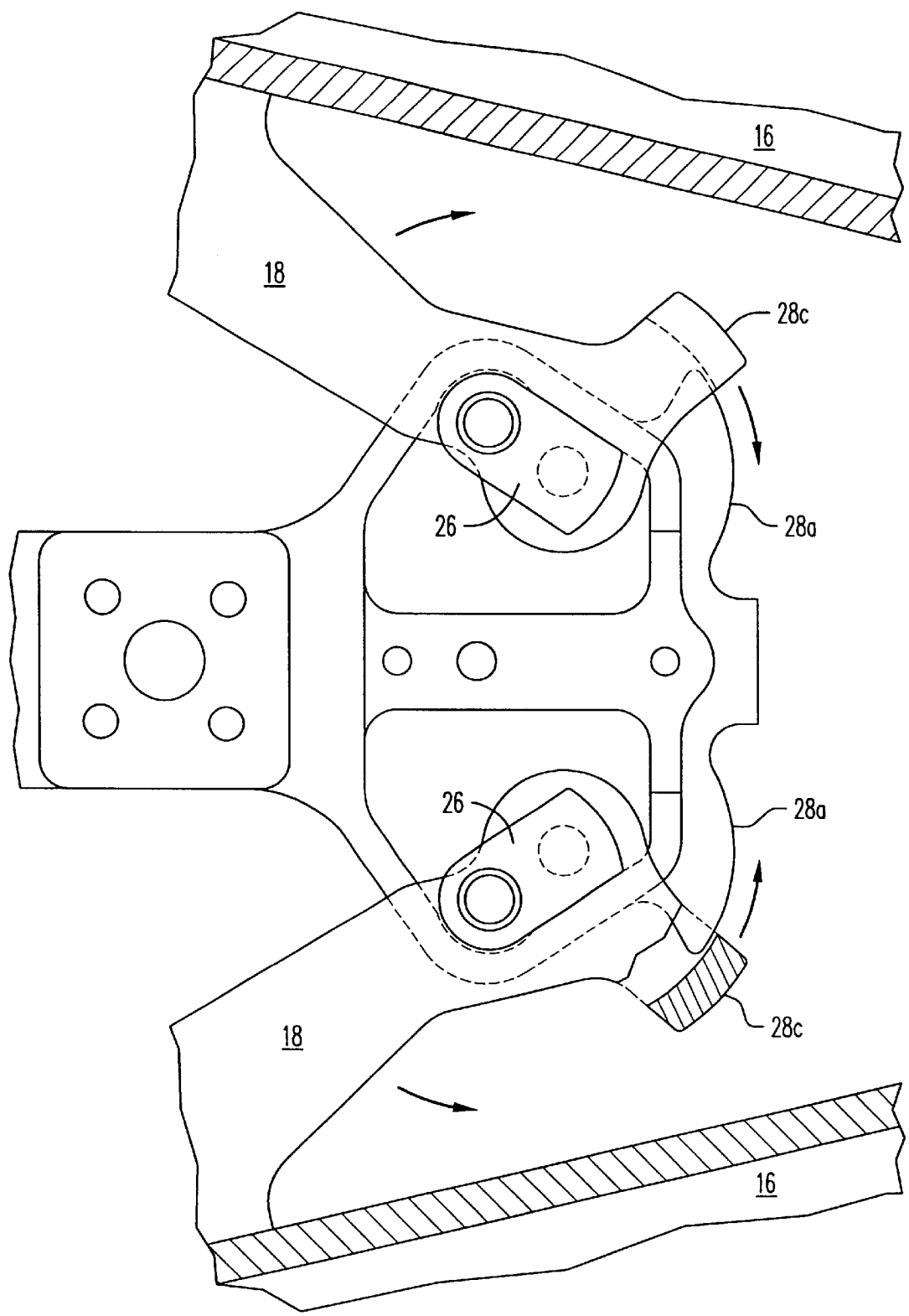
FIG. 10 is a side elevational view of an aft mount, like that shown in FIG. 9, in accordance with another embodiment of the present invention.

FIG. 10 illustrates an alternate embodiment of the latching means wherein the follower is in the form of a simple flange 28c extending from the hinge arm instead of the wheel 28b illustrated in FIG. 9. The flange 28c functions in a similar manner to the wheel 28b by following the track 28a as the doors pivot for trapping the swing links 26 in their aft positions.

Figure 11:
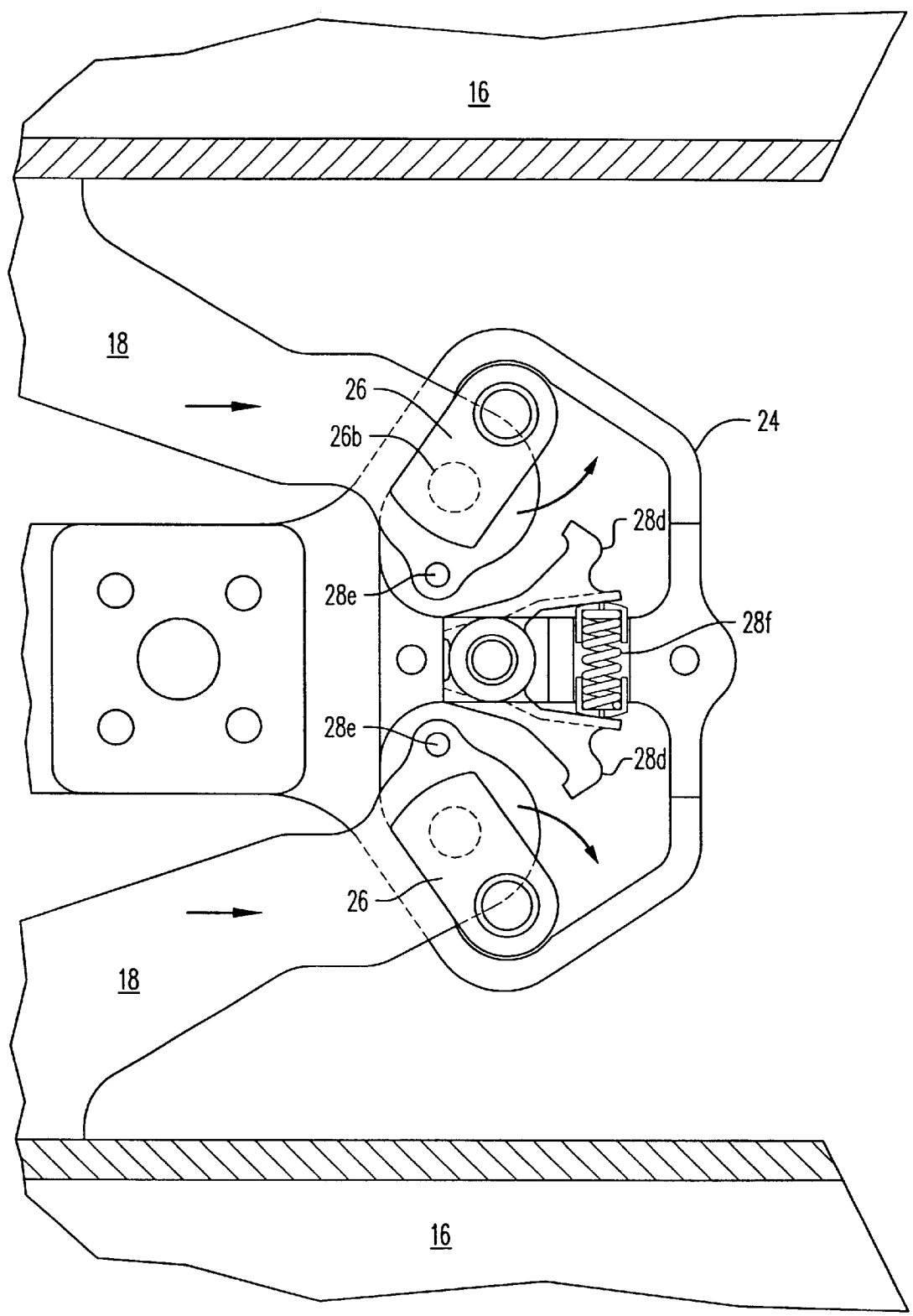
FIG. 11 is a side elevational view of an aft mount, like FIG. 8, in accordance with another embodiment of the present invention.
Figure 12:
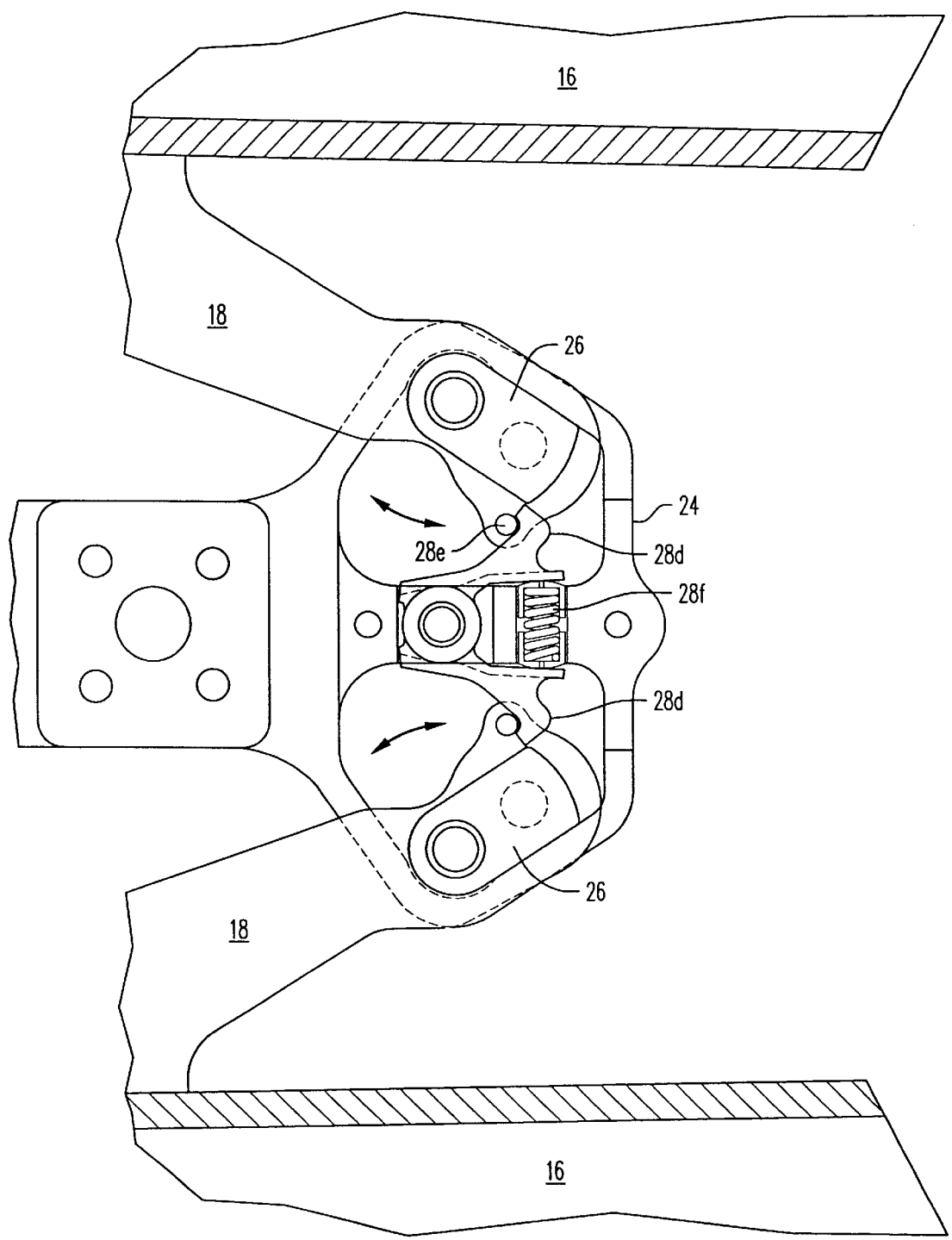
FIG. 12 is a side elevational view of the aft mount illustrated in FIG. 11 corresponding with the door position illustrated in FIG. 4.
Figure 13:
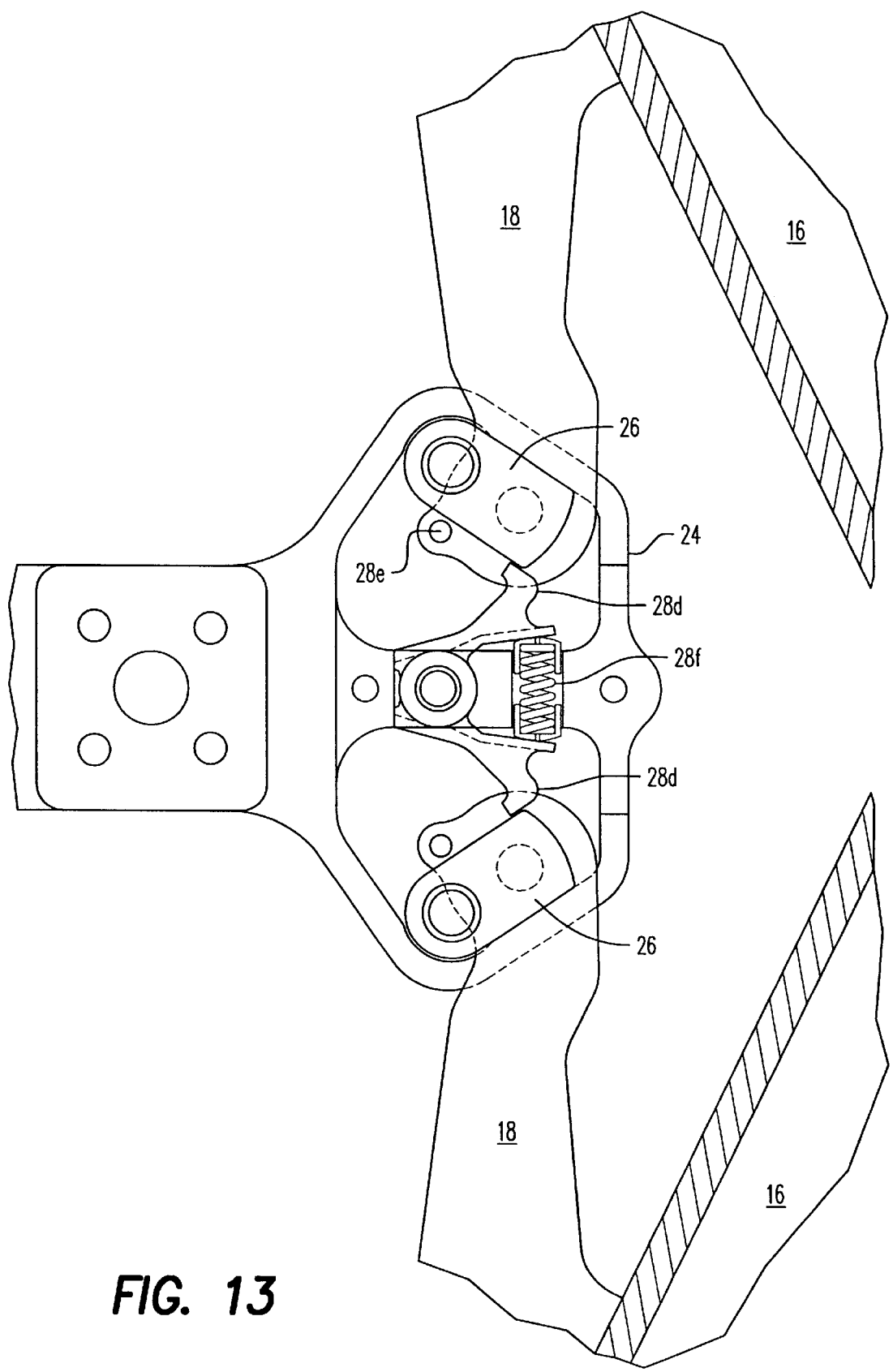
FIG. 13 is a side elevational view of the aft mount illustrated in FIG. 11 corresponding with the door position illustrated in FIG. 5.

FIGS. 11–13 illustrate yet another embodiment of the latching means for the swing links 26 in which the followers 28b,c illustrated in FIGS. 9 and 10 are not used. However, in an alternate embodiment, the followers of FIGS. 9 and 10 may be used in conjunction with the latching mechanism illustrated in FIGS. 11–13.

As initially shown in FIG. 13, the latching means in this embodiment include a hook 28d pivotally mounted in the frame 24 for abutting the swing link 26 in its aft swing position. A pair of the hooks 28d are preferably mounted from a common pivot shaft centrally in the frame 24 for cooperating with the two swing links 26 of the opposite doors.

In FIG. 11, the swing links 26 are in their forward positions displaced axially forwardly of the respective hooks 28d. In FIG. 12, the swing links 26 have been swung to their aft swing positions inside the frame adjacent the respective hooks 28d. In FIG. 13, the latching hooks 28d abut the forward distal ends of the swing links 26 to trap the links in their aft swing positions during pivoting of the doors and hinge arms thereon.

In order to deploy and retract the hooks 28d illustrated in FIGS. 11–13 for controlling swinging of the swing links 26, the latching means in this embodiment preferably also includes a release pin 28e which extends laterally outwardly from a corresponding extension of each hinge arm 18 near the second pin 26b. A compression coil spring 28f is suitably mounted in the frame 24 between the opposite hooks 28d for biasing each hook toward the respective swing links 26.

As shown in FIG. 11, the spring 28f urges the hooks 28d outwardly toward the respective swing links 26 which are spaced axially forwardly thereof when the links are in their forward swing position. In FIG. 12, the swing links are swung axially aft so that the respective release pins 28e engage cam surfaces or ramps on the respective hooks 28d to divert them inwardly from the swing links further compressing the spring. Each swing link 26 is thusly permitted to move past the depressed hook 28d into its aft swing position. The hinge arm 18 is then pivoted during door deployment which releases the hook 28d for engaging the forward side of the swing link trapping it in its aft position within the frame 24.

Upon retraction of the reverser doors, the motion of the hinge arm 18 is 24 reversed, with the pin 28e again engaging the respective hook 28d as illustrated in FIG. 12 for compressing the spring and releasing the hook from the swing link. The swing link is then permitted to swing axially forwardly to stow the doors as illustrated in FIG. 11.

Since the swing arms 26 are permitted to swing between their forward and aft positions to lock and unlock the reverser doors within the cowling 14c, it is desirable to further include means 30 for aligning each of the doors 16 with the cowling 14c during door movement in deployment and retraction. The aligning means 30 are preferably also configured for preventing swinging of the wing links 26 as the doors are pivoted outwardly or inwardly.

In the exemplary embodiment illustrated in FIG. 2, the aligning means include respective guide or docking tracks 30a fixedly joined to the nozzle adjacent the forward lip 16a at opposite circumferential ends of each door. An axially forwardly extending follower 30b is fixedly joined to respective doors at the forward lips thereof. The follower may include a wheel or roller pivotally joined to the distal end of a forward tab. As shown in FIGS. 3 and 4, the follower 30b is configured for following the track 30a during door pivoting on the swing links 26 in their aft swing positions.

The guide track 30a is preferably disposed adjacent the cowling 14c and faces aft. The follower 30b is preferably disposed at the door forward lip 16a and faces axially forwardly.

In this way, the guide track 30a faces aft and has a suitable arc along which the follower 30b may roll in abutment against the track during door movement for maintaining the swing links in their aft swing positions and maintaining alignment of the doors.

The swing and pivot movement of the swing links 26 illustrated in FIG. 3 may thusly be controlled at both axial ends of the doors. The various latching means 28 may be used in the aft mounts themselves for controlling swinging of the swing links, with the aligning means being used at the forward end of the doors for maintaining alignment of the doors during pivoting thereof. The aligning means 30 are preferably limited in configuration for maintaining the swing links in their aft swing positions until the doors have pivoted outwardly sufficiently for engaging the latching means 28. The aligning means 30 maintain the aft swing positions of the swing links during initial pivoting movement of the doors until the latching means 28 take over for the remainder of pivoting to final deployment. For retraction of the doors, the latching means 28 initially control the aft swing position, followed in turn by the aligning means 30.

Figure 14:
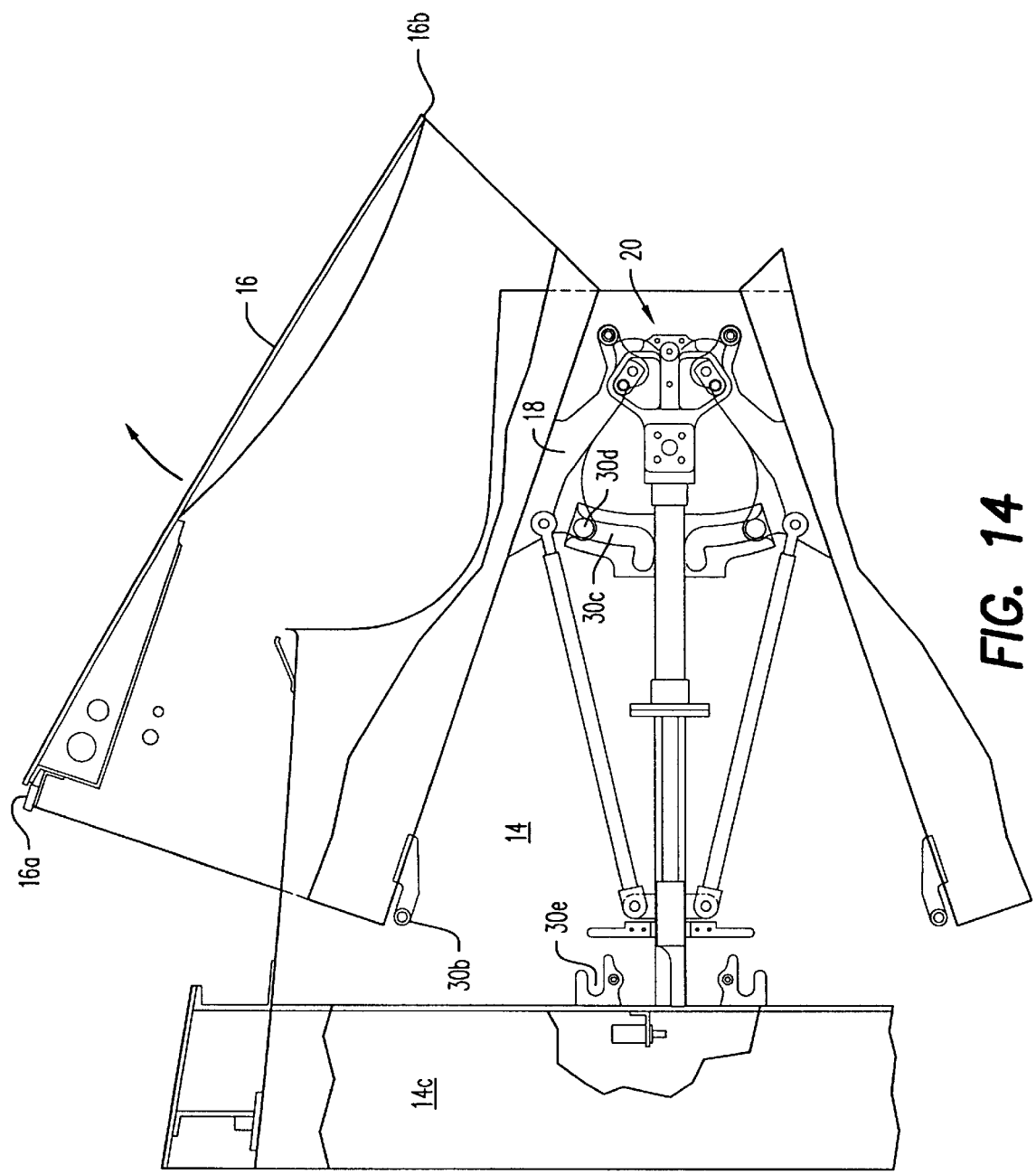
FIG. 14 is a side elevational view of an aft mount corresponding with FIG. 4, and including a guide track and follower for maintaining alignment of the doors during movement.

FIG. 14 illustrates yet another embodiment of the invention wherein the aligning means 30 include a guide track 30c disposed adjacent the forward end of the hinge arm of each door 16, and a cooperating follower 30d pivotally disposed at the forward end of the hinge arm. In this way, the aligning means are disposed adjacent the hinge arm at the aft end of the doors instead of at the forward end of the doors in the embodiment illustrated in FIG. 3.

In the FIG. 14 embodiment, the guide track 30c preferably includes an axially and radially extending slot in the form of a J, and the follower 30d preferably includes a roller or wheel sized to fit within the guide slot to follow its contour. The guide slot 30c is suitably arcuate for matching the pivoting movement of the follower 30d as the door is pivoted outwardly or inwardly. The guide slot 30c has an axially forward extension which axially receives the follower to permit the swing links to swing to their forward positions and nest the door forward lips 16a inside the cowling 14c.

As initially shown in FIG. 2, the thrust reverser preferably also includes means for locking the doors 16 in their stowed position adjacent the cowling 14c. As indicated above, the locking means in its simplest form includes nesting the door forward lips 16a inside the aft edge seat of the cowling 14c, with the swing links 26 being disposed in their forward swing positions. In this way, the doors are prevented from pivoting outwardly by the obstruction provided by the nested cowling 14c. Furthermore, the forward swing positions of the swing links ensures that exhaust pressure forces operate to maintain the swing links in their forward positions ensuring secured nesting of the doors and cowling.

In the FIG. 2 embodiment, the locking means may also include the guide follower 30b fixedly joined to the forward lip 16a of each door, cooperating with an axial slot 30e fixedly mounted to the nozzle at the cowling, and preferably in a lower portion of the guide track 30a for axially receiving the follower in the stowed position. As the follower 30b reaches the locking slot 30e during retraction of the door, the actuator 22b pulls the hinge arm axially forwardly, with the swing link 26 reaching its forward swing position as the follower 30b is seated axially into its locking slot 30e. The locking slot 30e thusly provides additional locking of each door at both of its circumferentially opposite sides along the forward lip 16a.

As initially shown in FIG. 3, each of the actuators 22b preferably includes a carriage 32 fixedly joined to the distal end of the extendable shaft thereof. The drive links 22a may be conveniently pivotally joined to the carriage 32. And, an outwardly extending straight latch 34 is also joined to the carriage for trapping the follower 30b in the locking slot 30e in the door stowed position.

As shown in FIG. 3, the carriage 32 and latch 34 are partially retracted with the actuator shaft to uncover the respective locking slots 30e. In the release position of the doors illustrated in FIG. 3, the follower 30b may leave or enter the locking slot 30e without obstruction from the latch 34.

In the stowed position illustrated in FIG. 2, the follower 30b bridges the locking slot 30e as the latch 34 moves axially forwardly with extension of the actuator shaft. The latch 34 thusly traps the follower 30b in the locking slot 30e to prevent uncoupling thereof without retraction of the actuator shaft.

Additional locking redundancy may be provided by including an aperture in the distal end of the carriage 32 illustrated in FIG. 2. A solenoid-actuated locking pin 36 is fixedly mounted to the nozzle adjacent the carriage for engaging the aperture therein when the actuator shaft is fully extended in the door stowed position. The locking pin 36 prevents the actuator shaft from being withdrawn, and thusly prevents the latch 34 from uncovering the follower 30b. And thusly, 26 the follower 30e is prevented from leaving its locking slot 30e.

The various embodiments disclosed above all include the unique swing links 26 which enjoy simplicity of construction and correspondingly high reliability. The swing links permit the individual thrust reverser doors to be nested and locked within the upstream cowling preventing their unintended deployment. Only upon aft swinging of the links are the doors permitted to initially swing aft for axially translating the forward lips away from the cowling to release the doors for deployment. The aft-position swing links then permit pivotal deployment of the doors for thrust reverser operation.

This swing and rotate deployment sequence has additional advantages. The nested doors have enhanced alignment with the cowling when stowed, and limit door deflection under operational pressure loads. Door locking is simplified, and weight and complexity reduced, because locking is effected merely by holding the doors in their forward positions. The simple pin and slot locks allow design certification by the reliability approach, instead of certification to the more complex in-flight deployment alternative.

Furthermore, aft door translation during deployment provides additional clearance around the nozzle at its outlet exit plane. The nozzle may therefore be larger to minimize fishmouth or non-circular area at its outlet. The door pivots in the aft mounts may also be located further forward from the nozzle aft outlet to permit aft-fairing of the nozzle outlet to reduce base area and base drag therefrom. The additional space provided behind each aft mount allows the fairing or nacelle to converge to the nozzle exit, and substantially reduce the overall wall thickness thereat and base drag therefrom.

The exemplary embodiments of the swing pivot thrust reverser described above provide effective and highly reliable locked stowing of the reverser doors with relative simplicity, reduced weight, and reduced costs of acquisition and maintenance. The multiple levels of redundancy may be used as desired in various combinations for various applications.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A mount for mounting a hinge arm of a thrust reverser door to an exhaust nozzle, comprising:
   a frame configured for attachment to said nozzle; and
   a swing link having a first pin at one end pivotally joined to said frame, and a second pin at an opposite end for pivotally joining said hinge arm to said link to permit said hinge arm at said second pin to both swing and pivot at said frame for axially translating and sequentially pivoting said door.

2. A mount according to claim 1 wherein said swing link further comprises a pair of swing arms each having a respective one of said first pins extending oppositely from each other, and joined together by a common second pin for pivotally mounting said hinge arm therebetween.

3. A mount according to claim 1 in combination with a thrust reverser, and further comprising:
   said exhaust nozzle having a cowling at an upstream end, and an outlet at an opposite downstream end;
   a pair of said thrust reverser doors disposed on diametrically opposite sides of said nozzle, and each door including axially opposite forward and aft lips and circumferentially opposite hinge arms; and
   a pair of said mounts fixedly joined to said nozzle adjacent said hinge arms for pivotally mounting said doors to said nozzle, with said mount frames being fixedly joined to said nozzle, and each of said hinge arms being joined to said frames by respective swing links.

4. A thrust reverser according to claim 3 further comprising:
   respective drive links pivotally joined to said doors forward of said hinge arms; and
   pair of actuators disposed on said nozzle opposite sides, and pivotally joined to said drive links for deploying and retracting said doors by swinging and pivoting of said hinge arms in said mounts.

5. A thrust reverser according to claim 4 wherein said drive links extend axially in a stowed position of said doors, and said swing links are disposed in a forward swing position.

6. A thrust reverser according to claim 4 wherein said drive links are inclined in a deployed position of said doors, and said swing links are disposed in an aft swing position.

7. A thrust reverser according to claim 4 further comprising means for latching each of said swing links in an aft swing position.

8. A thrust reverser according to claim 7 wherein said latching means comprise:
   a track fixedly joined to said frame in each mount; and
   a follower joined to each hinge arm to follow said track as said hinge arm pivots on said swing link in said aft position thereof.

9. A thrust reverser according to claim 8 wherein said follower comprises a wheel for riding said track.

10. A thrust reverser according to claim 8 wherein said follower comprises a flange for following said track.

11. A thrust reverser according to claim 7 wherein said latching means comprise a hook pivotally mounted in said frame of each mount for abutting said swing link in said aft swing position thereof.

12. A thrust reverser according to claim 11 wherein said latching means further comprise a respective release pin fixedly joined to each hinge arm adjacent said hook for releasing said hook from said swing link.

13. A thrust reverser according to claim 12 wherein said latching means further comprise a spring biasing said hook toward said swing link.

14. A thrust reverser according to claim 4 further comprising means for aligning each of said doors with said cowling during movement thereof.

15. A thrust reverser according to claim 14 wherein said aligning means comprise:
   a guide track fixedly joined to said nozzle adjacent each door; and
   a follower fixedly joined to a respective door for following said track during door pivoting upon said swing link in said aft swing position thereof.

16. A thrust reverser according to claim 15 wherein:
   said guide track is disposed adjacent said cowling; and
   said follower is disposed at said door forward lip.

17. A thrust reverser according to claim 16 wherein:
   said guide track faces aft; and
   said follower faces forward to abut said guide track during door movement to maintain said swing links in an aft swing position.

18. A thrust reverser according to claim 15 wherein:
   said guide track is disposed adjacent said hinge arm of each door; and
   said follower is disposed on said hinge arm.

19. A thrust reverser according to claim 18 wherein:
   said guide track comprises a slot; and
   said follower comprises a wheel sized to follow said track.

20. A thrust reverser according to claim 4 further comprising means for locking said doors in a stowed position adjacent said cowling.

21. A thrust reverser according to claim 20 wherein said locking means comprise nesting said door forward lips inside said cowling, with said swing links being disposed in a forward swing position.

22. A thrust reverser according to claim 21 wherein said locking means further comprise:
   an axial follower fixedly joined to said forward lip of each door; and
   an axial slot fixedly mounted to said nozzle at said cowling for axially receiving said follower.

23. A thrust reverser according to claim 22 wherein:
   each of said actuators includes an extendable shaft having a carriage fixedly joined to a distal end thereof; and
   said carriage is pivotally joined to respective ones of said drive links, and includes a latch for trapping said follower in said slot in said stowed position.

24. A thrust reverser according to claim 23 wherein:
   said carriage further includes an aperture at a distal end thereof; and
   said locking means further include a locking pin mounted to said nozzle adjacent said carriage for engaging said aperture therein.

25. A thrust reverser comprising:
   an exhaust nozzle having a cowling at an upstream end, and an outlet at an opposite downstream end;
   a pair of reverser doors disposed on diametrically opposite sides of said nozzle, and each including axially opposite forward and aft lips and circumferentially opposite hinge arms;
   a pair of aft mounts fixedly joined to said nozzle adjacent said hinge arms for pivotally mounting said doors to said nozzle; and
   each of said mounts including a frame fixedly attached to said nozzle, and a swing link having a first pin at one end pivotally joined to said frame, and a second pin at an opposite end pivotally joining a respective hinge arm to said link to permit said hinge arm at said second pin to both swing and pivot at said frame for axially translating and seguentially pivoting said doors.

26. A thrust reverser according to claim 25 further comprising means for deploying and retracting said doors by swinging and pivoting said hinge arms in said mounts.

27. A thrust reverser according to claim 26 wherein said deploying and retracting means are effective for swinging said swing links to a forward swing position to nest said door forward lips inside said cowling.

28. A thrust reverser according to claim 27 wherein said deploying and retracting means are effective for swinging said swing links to an aft swing position to decouple said door forward lip from said cowling.

29. A thrust reverser according to claim 28 further comprising means for latching said swing links in said aft swing position.

30. A thrust reverser according to claim 28 further comprising means for aligning said door with said cowling during movement thereof.

31. A thrust reverser according to claim 28 further comprising means for locking said doors in a stowed position to nest said door forward lips inside said cowling.

32. A method of deploying a pair of thrust reverser doors surrounding an exhaust nozzle adjoining a cowling, comprising:
   pivotally mounting said doors on corresponding swing links pivoted inside a pocket of a frame attached to said nozzle;
   swinging said swing arms and doors axially away from said cowling; and
   sequentially pivoting said doors on said swing links outwardly from said nozzle to reverse flow of gas therefrom.

33. A method according to claim 32 wherein said doors are swung in a first rotary direction, and pivoted in an opposite, second rotary direction.

34. A method according to claim 33 wherein said doors are swung to decouple said doors from nesting inside said cowling.

35. A method according to claim 34 further comprising preventing swinging of said doors during pivoting thereof.

36. A method according to claim 35 further comprising retracting said doors by reversing pivoting and swinging thereof to nest said doors inside said cowling.

37. A method according to claim 36 further comprising locking said doors in said nested position inside said cowling.

\* \* \* \* \*